US009754495B2

(12) United States Patent
Whelan

(10) Patent No.: US 9,754,495 B2
(45) Date of Patent: Sep. 5, 2017

(54) ASSOCIATIVE MEMORY SYSTEM AND METHOD FOR FLIGHT PLAN MODIFICATION

(71) Applicant: The Boeing Company, Chicago, IL (US)

(72) Inventor: John Whelan, Burien, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/677,422

(22) Filed: Apr. 2, 2015

(65) Prior Publication Data

US 2016/0293017 A1 Oct. 6, 2016

(51) Int. Cl.

| | |
|---|---|
| ***G08G 5/00*** | (2006.01) |
| ***G05D 1/00*** | (2006.01) |
| ***G01C 21/00*** | (2006.01) |
| ***G01C 23/00*** | (2006.01) |

(52) U.S. Cl.

CPC ......... *G08G 5/0039* (2013.01); *G08G 5/0021* (2013.01); *G08G 5/0091* (2013.01)

(58) Field of Classification Search

CPC combination set(s) only.
See application file for complete search history.

(56) References Cited

U.S. PATENT DOCUMENTS 6,463,383 B1 * 10/2002 Baiada .................. G06Q 10/06 342/36
7,129,857 B1 * 10/2006 Spirkovska ............. G01W 1/00 340/971
7,720,630 B1 * 5/2010 Miller .................... G01C 23/00 702/150
8,121,783 B2 * 2/2012 Bitar .................... G01C 23/005 244/181
8,214,075 B2 * 7/2012 Griffin ................. G06Q 10/047 343/757

(Continued)

FOREIGN PATENT DOCUMENTS

EP 2749984 A2 7/2014
EP 2790114 A2 10/2014
WO WO01/25727 A1 4/2001

OTHER PUBLICATIONS

European Search Report, dated Oct. 24, 2016 for Application No. 16153996.0 (The Boeing Company).

*Primary Examiner* — Yonel Beaulieu
(74) *Attorney, Agent, or Firm* — Alston & Bird LLP

(57) ABSTRACT

An associative memory system, method and computer-readable storage medium are provided to modify a flight plan. In regards to an associative memory system, a receiver module is provided that is configured to receive a flight plan of an aircraft. The flight plan includes a plurality of attribute categories and their associated attribute values. The associative memory system also includes an associative memory configured to compare attribute values of the flight plan with corresponding attribute values of prior flight plans to identify one or more related flight plans. The one or more related flight plans include intangible data related to a respective flight. The associative memory system also includes a modification module configured to modify the flight plan of the aircraft based upon information from one or more of the related flight plans, including the intangible data from one or more of the related flight plans.

14 Claims, 6 Drawing Sheets

(56) References Cited

U.S. PATENT DOCUMENTS

| | | | | |
|---|---|---|---|---|
| 8,655,507 | B2 * | 2/2014 | Coulmeau | G08G 5/0039 340/945 |
| 8,914,604 | B2 | 12/2014 | Whelan | |
| 8,935,282 | B2 | 1/2015 | Whelan et al. | |
| 8,977,482 | B2 * | 3/2015 | Ballin | G08G 5/0034 701/120 |
| 2004/0193362 | A1 * | 9/2004 | Baiada | G08G 5/0013 701/120 |
| 2006/0085164 | A1 * | 4/2006 | Leyton | G01W 1/10 702/179 |
| 2006/0259234 | A1 | 11/2006 | Flynn et al. | |
| 2013/0046422 | A1 * | 2/2013 | Cabos | G08G 5/0034 701/3 |
| 2013/0054476 | A1 | 2/2013 | Whelan | |
| 2013/0103690 | A1 | 4/2013 | Arnold et al. | |
| 2014/0149655 | A1 | 5/2014 | Whelan | |
| 2014/0310312 | A1 * | 10/2014 | Whelan | G06F 17/30684 707/774 |
| 2015/0046643 | A1 | 2/2015 | Whelan | |

* cited by examiner

40

| Flight: 261<br>Attributes<br>category value |
|---|
| aircraft: 737<br>source: Seattle<br>target: Chicago<br>passengers: 122<br>crew: 5<br>weight: 870000<br>weather: rain<br>clouds: yes<br>fog: yes<br>⋮ |

42

Flights Like Flight: 261

| Score | Flight | Duration | Matching Attributes |
|---|---|---|---|
| 1.00 | 1420 | 47000 | source: Seattle, target: Chicago, weather: rain, aircraft: 737, weight: 870000, clouds: yes, fog: yes |
| 0.91 | 2574 | 46800 | source: Seattle, target: Chicago, weather: rain, aircraft: 737, passengers: 122, clouds: yes |
| 0.91 | 111 | 46800 | source: Seattle, target: Chicago, weather: rain, aircraft: 737, clouds: yes, fog: yes |
| 0.87 | 529 | 46900 | source: Seattle, weather: rain, aircraft: 737, weight: 870000, clouds: yes |
| 0.71 | 811 | 47000 | source: Seattle, weather: rain, aircraft: 737, weight: 870000 |
| 0.71 | 8969 | 47000 | source: Seattle, weather: rain, aircraft: 737, passengers: 122 |
| 0.70 | 236 | 46800 | source: Seattle, aircraft: 737, weight: 870000 |
| ⋮ | ⋮ | ⋮ | |

Figure 5

ASSOCIATIVE MEMORY SYSTEM AND METHOD FOR FLIGHT PLAN MODIFICATION

TECHNOLOGICAL FIELD

An example embodiment of the present disclosure relates generally to the modification of a flight plan and, more particularly, to an associative memory system, method and computer-readable storage media that are configured to modify a flight plan based on intangible data.

BACKGROUND

A flight plan is a document filed, such as by a pilot or flight dispatcher, with the relevant civil aviation authority, such as the Federal Aviation Authority (FAA) of the United States, prior to the departure of a flight. The flight plan indicates the anticipated route or flight path of the aircraft. The flight plan also generally includes information regarding the origin and destination of the flight, the anticipated duration of the flight, the airspeed and cruising altitude of the flight, and alternate airports that could be utilized, such as an instance in which the weather or a mechanical issue forces the aircraft to deviate from the planned route or flight path. The flight plan may also indicate the type of flight, such as whether the flight will be governed by instrument flight rules or visual flight rules, as well as information regarding the pilot and the number of passengers and information regarding the aircraft.

Although the preparation and filing of flight plans is helpful to organize flight activity within a region, the information from which a flight plan is based is somewhat limited and is typically based upon the historical experience of the pilot or flight dispatcher. As such, a flight plan may not take into account information relating to real time conditions that deviate from the historical experience of the pilot or flight dispatcher and that may disrupt the flight. As a result, a flight plan may sometimes be less accurate than is desired, such as in instances in which the current conditions along the flight path or at the destination airport differ from those that had been historically experienced with the difference being such that the flight of the aircraft is likely to be altered. For example, conditions along the flight path or at the destination airport may deviate from those that have been historically experienced in a manner that would cause the flight to actually have a longer duration than that anticipated by the flight plan. Deviations in the duration of a flight from those set forth by the flight plan can adversely impact scheduling and routing of the various flights in the region and may also adversely impact the passenger experience since their expectations as defined by the flight plan may not have been met.

BRIEF SUMMARY

An associative memory system, method and computer-readable storage medium are therefore provided in order to modify a flight plan in such a manner that the resulting flight plan is more accurate. In this regard, the associative memory system, method and computer-readable storage medium of an example embodiment are configured to take into account information from related flight plans, including intangible data included in the related flight plan, and to correspondingly modify the flight plan based upon the information from the related flight plans. As such, information from the related flight plans that is indicative of deviations in the conditions along the flight path or at the destination airport from those that have been historically encountered may be taken into account in the modification of the flight plan such that the resulting flight plan more accurately represents the current conditions that will be experienced.

In an example embodiment, an associative memory system is provided for modifying a flight plan based upon intangible data. The associative memory system includes a receiver module configured to receive a flight plan of an aircraft. The flight plan includes a plurality of attribute categories and their associated attribute values. The associative memory system also includes an associative memory that comprises a data storage device configured to identify a storage location from which data may be retrieved by its informational content rather than an address. The associative memory is configured to compare attribute values of the flight plan with corresponding attribute values of a plurality of prior flight plans to identify one or more related flight plans from among the plurality of prior flight plans. The one or more related flight plans include intangible data related to a respective flight. The associative memory system also includes a modification module configured to modify the flight plan of the aircraft based upon information from one or more of the related flight plans, including the intangible data from one or more of the related flight plans.

The intangible data of an example embodiment is included in unstructured data of one or more of the prior flight plans. For example, the unstructured data may relate to the weather en route, seasonal trends, employment issues, landing conditions, turbulence, work stoppages, work slowdowns or passenger characteristics. The associative memory of an example embodiment is configured to compare attribute categories and values that are both structured and unstructured. The associative memory of an example embodiment is configured to differently weight at least some of the attribute categories and to identify one or more related flight plans based at least in part on the differently weighted attribute categories. In an embodiment in which a radius is defined relative to a numeric attribute value of a respective attribute, the associative memory is configured to identify numeric attribute values of the respective attributes of the flight plan and one or more prior flight plans to be related in an instance in which the numeric attribute values of the respective attributes differ by no more than the radius. The modification module of an example embodiment is configured to modify a flight duration of the flight plan based upon a combination of flight durations of the one or more related flight plans.

In another embodiment, a method is provided for modifying a flight plan based upon intangible data. The method includes receiving a flight plan of an aircraft. The flight plan includes a plurality of attribute categories and their associated attribute values. The method also includes using as associative memory to compare attribute values of a flight plan with corresponding attribute values of a plurality of prior flight plans to identify one of more related flight plans from among the plurality of prior flight plans. The one or more related flight plans include intangible data relating to a respective flight. The associative memory includes a data storage device configured to identify a storage location from which data may be retrieved by its informational content rather than an address. The method also includes modifying the flight plan of the aircraft based upon information from one or more of the related flight plans including the intangible data from one or more of the related flight plans.

The intangible data of an example embodiment is included in unstructured data of one or more of the prior flight plans. For example, the unstructured data may relate to the weather en route, seasonal treads, employment issues, landing conditions, turbulence, work stoppages, work slowdowns or passenger characteristics. The associative memory of an example embodiment is configured to compare attribute categories and values that are both structured and unstructured. The method of an example embodiment uses the associative memory to differently weight at least some of the attribute categories and to identify one or more related flight plans based at least in part upon the differently weighted attribute categories. In an embodiment in which a radius is defined relative to a numeric attribute value of a respective attribute, the method further includes using the associative memory to identify numeric attribute values of the respective attribute of the flight plan and one or more of the prior flight plans to be related in an instance in which the numeric attribute values of the respective attribute differ by no more than the radius. The method of an example embodiment modifies the flight plan by modifying a flight duration of flight plan based upon a combination of the flight durations of the one or more related flight plans.

In a further example embodiment, a non-transitory computer-readable storage media is provided for modifying a flight plan based upon intangible data. The computer-readable storage media has computer-readable program code portions stored therein that, in response to execution by processor, cause an apparatus to receive a flight plan of an aircraft. The flight plan includes a plurality of attribute categories and their associated attribute values. The computer-readable program code portion also cause the apparatus, in response to execution by the processor, to use an associative memory to compare attribute values of the flight plan with corresponding attribute values of a plurality of prior flight plans to identify one or more related flight plans from among the plurality of prior flight plans. One or more of the related flight plans include tangible data related to a respective flight. The associative memory includes a data storage device configured to identify a storage location from which data may be retrieved by its informational content rather than an address. The computer-readable program code portions also cause the apparatus, in response to execution by the processor, to modify the flight plan of the aircraft based upon the information from one or more of the related flight plans, including the intangible data from one or more of the related flight plans.

The intangible data of an example embodiment is included in unstructured data of one or more of the prior flight plans. For example, the unstructured data may relate to weather en route, seasonal trends, employment issues, landing conditions, turbulence, work stoppages, work slowdowns or passenger characteristics. The computer-readable program code portions of an example embodiment also cause the apparatus, in response to execution by the processor, to use the associative memory to compare attribute categories and values that are both structured and unstructured. The computer-readable program code portions of an example embodiment also cause the apparatus, in response to execution by the processor, to use the associative memory to differently weight at least some of the attribute categories and to identify one or more related flight plans based at least in part upon the differently weighted attribute categories. The computer-readable program code portions of an example embodiment also cause the apparatus, in response to execution by the processor, to modify the flight plan by modifying a flight duration of a flight plan based upon a combination of the flight durations of the one or more related flight plans.

BRIEF DESCRIPTION OF THE DRAWINGS

Figure 1:
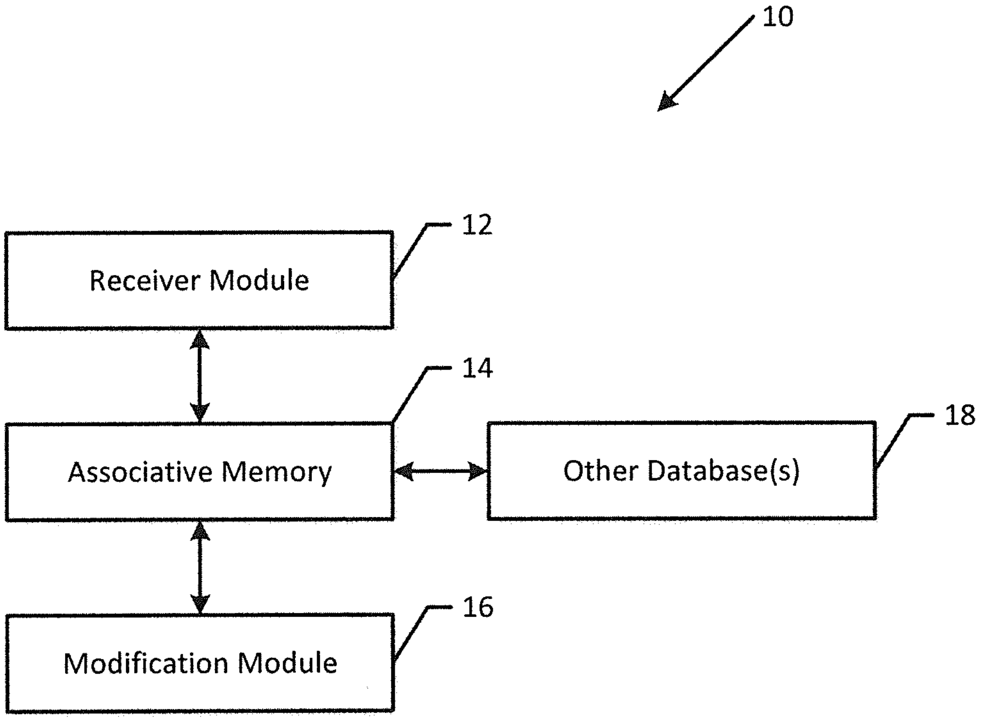
Figure 2:
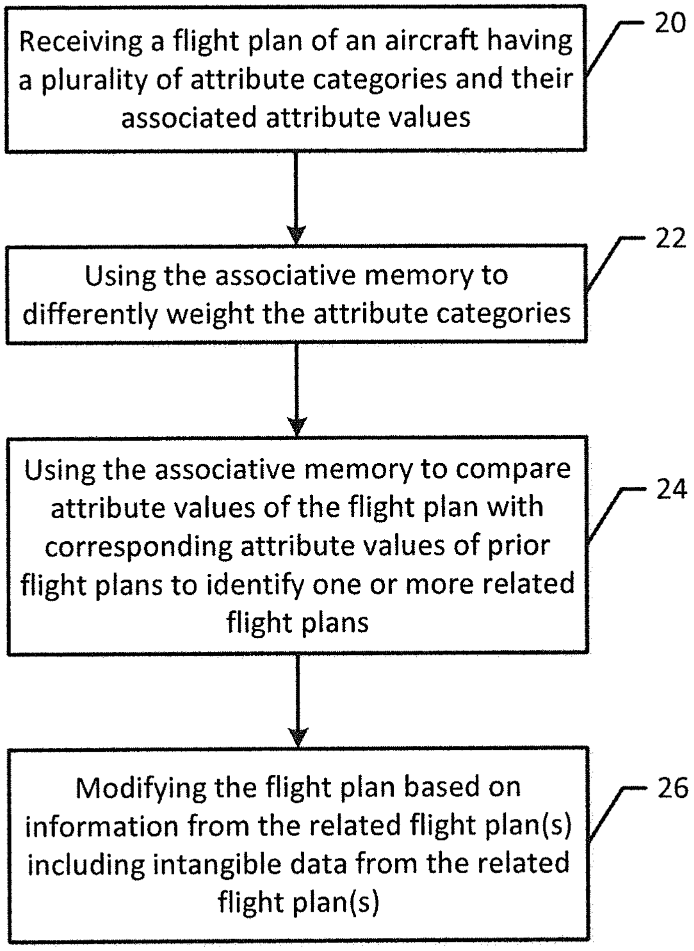
Figure 3A:
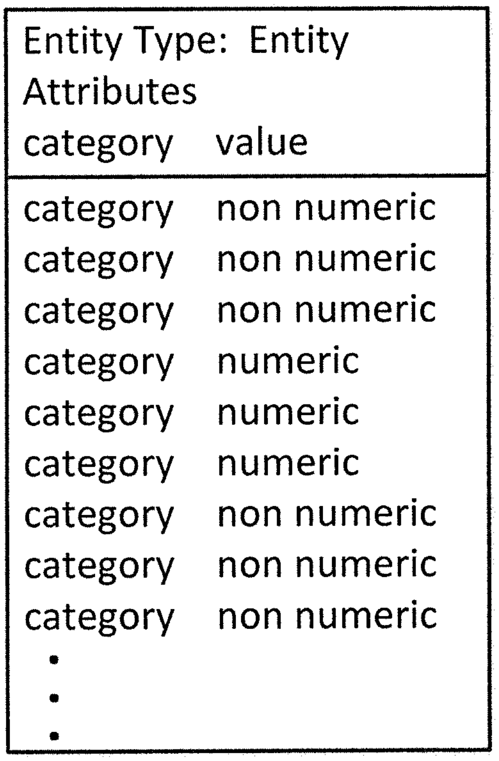
Figure 3B:
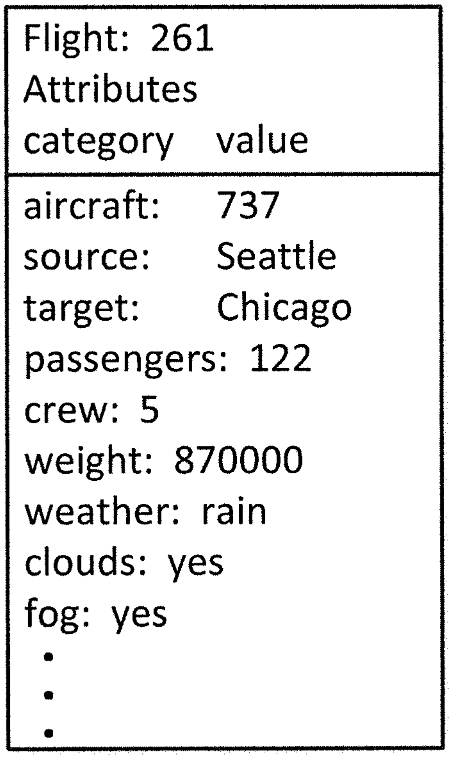
Figure 4A:
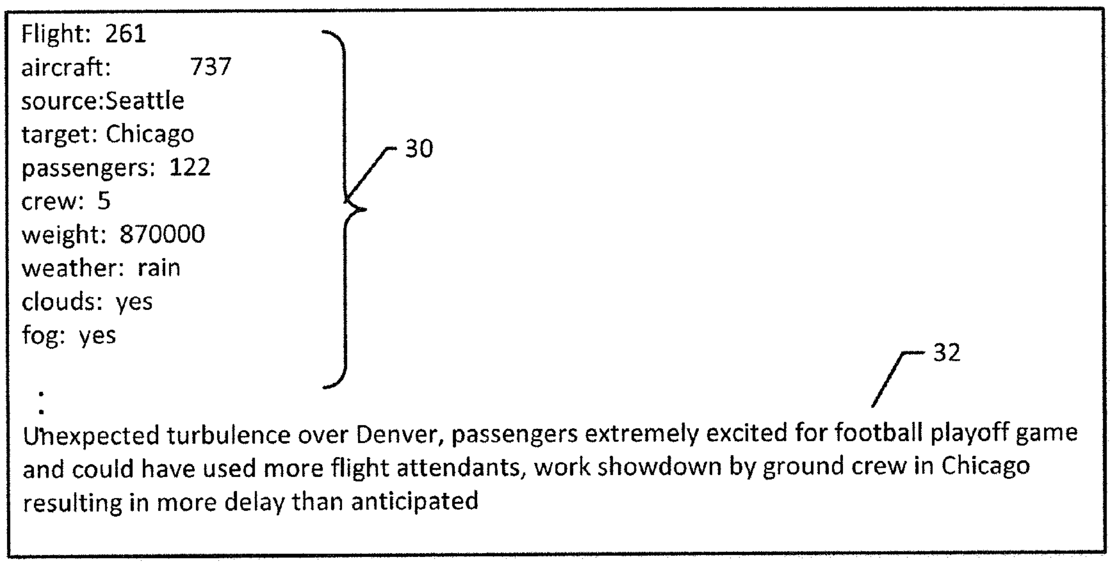
Figure 4B:
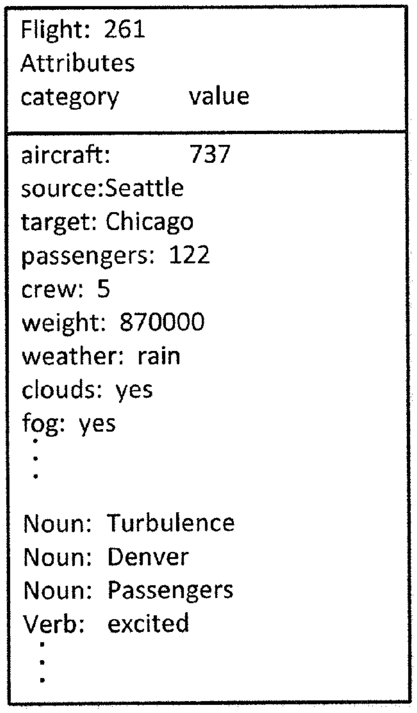
Figure 6:
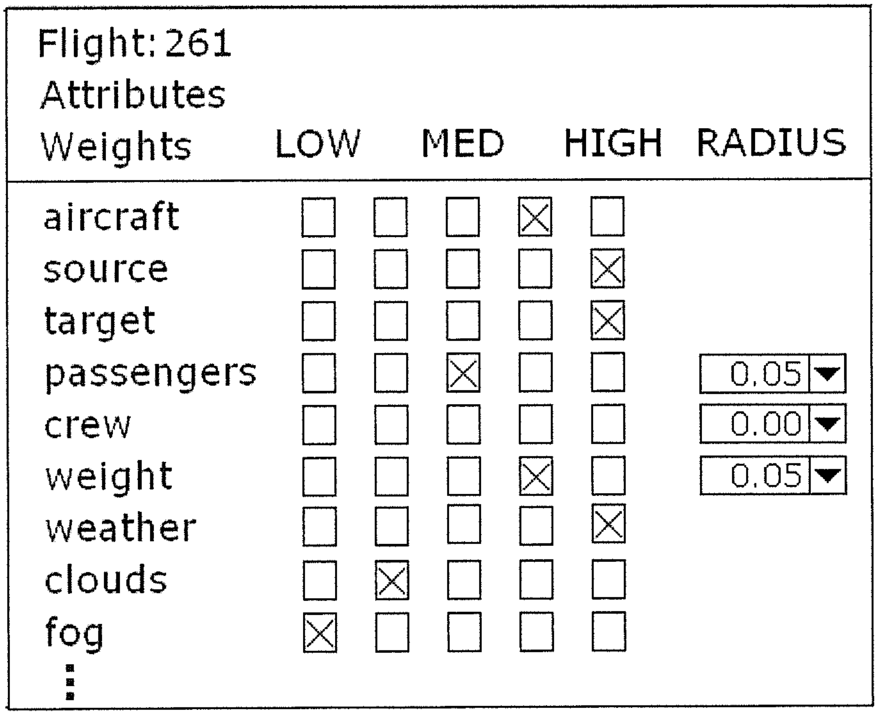

Having thus described embodiments of the present disclosure in general terms, reference will now be made to the accompanying drawings, which are not necessarily drawn to scale, and wherein:

FIG. 1 is a block diagram of an associative memory system for modifying a flight plan based upon the intangible data in accordance with an example embodiment of the present disclosures;

FIG. 2 is a flow chart illustrating the operations to be performed, such as by the associative memory system of FIG. 1, in order to modify a flight plan based upon the intangible data in accordance with the an example embodiment of the present disclosure;

FIG. 3A is a graphical representation of an entity including a plurality of attribute categories and their associated attribute values;

FIG. 3B is a graphical representation of an example of a flight plan as the entity depicted in FIG. 3A, including a plurality of attribute categories and their associated attribute values;

FIG. 4A depicts structured and unstructured data upon receipt by the associative memory system of an example embodiment of the present disclosure;

FIG. 4B is a graphical representation of another example of a flight plan including a plurality of attribute categories and their associated attribute values drawn from the structured and unstructured data of FIG. 4A in accordance with an example embodiment of the present disclosure;

FIG. 5 is a graphical representation of the identification of several related flight plans with matching attributes with the attribute category and attribute value matching the corresponding attribute categories and attribute values of the related flight plans in accordance with an example embodiment of the present disclosure; and FIG. 6 is a graphical representation of the weighting of various attribute categories in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Example embodiments of the present disclosure provide an associative memory system 10, method and computer-readable storage media for modifying a flight plan based upon intangible data. In this regard, the flight plan is a document, or a representation of a document, that may be filed, such as by a pilot or flight dispatcher, with the local civil aviation authority, such as the FAA, to indicate the planed route or flight path of an aircraft and that includes a variety of information related to the flight, the aircraft, the pilot and its passengers. As explained below, the associative memory system of example embodiments of the present disclosure may include or otherwise be in communication with a number of modules configured to perform respective operations described herein. Although shown as separate modules, it should be understood that the operations performed by more than one module may be integrated within and instead performed by a single module. It should also be understood that operations performed by one module may be separated and, instead, performed by more than one module.

A module may be embodied as various means for implementing the various functionalities of example embodiments of the present disclosure. A module may optionally include, for example, one or more processors, memory devices, Input/Output (I/O) interfaces, communications interfaces and/or user interfaces. The processor may include, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert. A multi-core processor enables multiprocessing within a single physical package. Further, the processor may be comprised of a plurality of transistors, logic gates, a clock (e.g., oscillator), other circuitry, and the like to facilitate performance of the functionality described herein. The processor may, but need not, include one or more accompanying digital signal processors (DSPs). A DSP may, for example, be configured to process real-world signals in real time independent of the processor. Similarly, an accompanying ASIC may, for example, be configured to perform specialized functions not easily performed by a more general purpose processor. In some example embodiments, the processor is configured to execute instructions stored in the memory device or instructions otherwise accessible to the processor. The processor may be specifically configured to operate such that the processor causes the module to perform various functionalities described herein.

Whether configured as hardware alone or via instructions stored on a computer-readable storage medium, or by a combination thereof, the processor may be an apparatus embodying or otherwise configured to perform operations of a module according to embodiments of the present disclosure while accordingly configured. Thus, in example embodiments where the processor is embodied as, or is part of, an ASIC, FPGA, or the like, the module is specifically configured hardware for conducting the operations described herein. Alternatively, in example embodiments where the processor is embodied as an executor of instructions stored on a computer-readable storage medium, the instructions specifically configure the module to perform the algorithms and operations described herein.

The memory device of a module may be one or more non-transitory computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (e.g., hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor of the module.

Further, the memory device of a module may be configured to store information, data, applications, computer-readable program code instructions, and/or the like for enabling the module to carry out various functions in accordance with example embodiments of the present disclosure described herein. For example, the memory device may be configured to buffer input data for processing by the processor of the module. Additionally, or alternatively, the memory device may be configured to store instructions for execution by the processor.

The I/O interface of a module may be any device, circuitry, or means embodied in hardware, software or a combination of hardware and software that is configured to interface the processor of the module with other circuitry or devices, such as the communications interface and/or the user interface of the module. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the module to perform, various functionalities of an example embodiment of the present disclosure.

The communication interface of a module may be any device or means embodied in hardware, software or a combination of hardware and software that is configured to receive and/or transmit data from/to one or more networks and/or any other device or module in communication with the respective module. The communications interface may be configured to provide for communications in accordance with any of a number of wired or wireless communication standards. The processor of the module may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. The module of one example may communicate via the communication interface with various other network elements in a device-to-device fashion and/or via indirect communications.

The user interface of a module may be in communication with the processor of the module to receive user input via the user interface and/or to present output to a user as, for example, audible, visual, mechanical or other output indications. The user interface may include, for example, a keyboard, a mouse, a joystick, a display (e.g., a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (e.g., software and/or firmware) stored on a memory accessible to the processor (e.g., the memory device of the module). In some example embodiments, the user interface circuitry is configured to facilitate user control of at least some functions of the module through the use of a display and configured to respond to user inputs. The processor may also comprise, or be in communication with, display circuitry configured to display at least a portion of a user interface, the display and the display circuitry configured to facilitate user control of at least some functions of the module.

As shown in FIG. 1, the associative memory system 10 may be embodied as a flight management system and may include a receiver module 12 which, as described above, may include an I/O interface, a communication interface, a user interface and/or a processor that are specifically configured to receive a flight plan of an aircraft. See also operation 20 of FIG. 2. The receiver module may be configured to receive the flight plan any of various sources and in multiple formats. In one embodiment, however, the receiver module receives the flight plan as input from a user, such as a pilot or flight dispatcher, provided via a user interface. Among other information, a flight plan indicates the anticipated route or flight path of the aircraft. The flight plan also generally includes information regarding the origin and destination of the flight, the anticipated duration of the flight, the airspeed and cruising altitude of the flight, and alternate airports that could be utilized. The flight plan may also indicate the type of flight, such as whether the flight will be governed by instrument flight rules or visual flight rules, as well as information regarding the pilot and the number of passengers and information regarding the aircraft.

The flight plan of the aircraft includes a plurality of attributes with each attribute including an attribute category and their associated attribute value. These attributes define various aspects of the flight plan. Although the flight plan including the attributes may be provided in various forms, the flight plan of an example embodiment may be provided in a form shown generally in FIG. 3A and an example of a flight plan in the form of FIG. 3A is depicted in FIG. 3B. The flight plan may identify an entity type, such as a route, with the value of such an entity type being an actual route, such as from Seattle to Chicago. The flight plan is an entity, which is an instantiation of the entity type. Thus, in an example embodiment in which the entity type is a particular route, the entity would be an actual flight along the route, such as a flight from Seattle to Chicago on a particular day and time. With reference to FIG. 3B, for example, the flight plan of an example embodiment may identify an entity type in the form of a particular flight with the entity being the flight number of the respective flight.

The flight plan also includes a plurality of attributes. Each attribute may be identified by a category and a corresponding attribute value. As shown in FIG. 3A, the associated attribute values may be numeric or non-numeric, such as text or alphanumeric. With respect to the example of FIG. 3B, examples of a category include the type of aircraft, the source, the target, the number of passengers, the number of crew, the weight, the anticipated weather along the route, an indication as to whether clouds are expected along the route and an indication as to whether fog is anticipated along the route. As shown in FIG. 3B, each different category of attributes includes an associated attribute value, some of which are numeric, such as 122, 5 and 870000, and others which are non-numeric, such as yes, rain and Seattle.

The attribute values represent data that is stored in memory, such as the associative memory 14 or another database 18 in communication with the associative memory of the associative memory system 10 of FIG. 1, or optionally with a file or file system. The data represented by the attribute values may be structured or unstructured. In this regard, structured data is defined by its structure and, as a result, is data that satisfies a predefined data model and resides in a fixed field. Generally, structured data has a predefined form and may be of a predefined type, such as numeric or non-numeric. Structured data may be identified, for example, by column names and tags, such as eXtensible Markup Language (XML) tags. Conversely, unstructured data is data that is not relational and is not constrained by a predefined data model so as to have no predefined form and, indeed, may be free form.

The flight plan of FIG. 3A and the example of a flight plan depicted in FIG. 3B illustrate a number of categories of attributes and associated attribute values. However, a flight plan may include any number of attributes including categories of attributes in addition to or instead of those depicted in FIGS. 3A and 3B. In particular, the flight plan of an example embodiment includes intangible data in the form of an attribute value or the data represented by an attribute value. Intangible data is data that is not amenable to be being measured or predicted, at least not based upon historical information. To facilitate the inclusion of intangible data within the flight plan, the intangible data may be unstructured data such that a wide variety of data may be included therein. The intangible data may represent any of a wide variety of different types of unstructured data including unstructured data relating to weather in route, seasonal trends, employment issues, landing conditions, turbulence, work stoppages, work slowdowns or passenger characteristics. As will be apparent, each of these different types of unstructured data may impact the flight including, for example, causing unanticipated delays in the flight.

By way of example, the data that constitutes a flight plan may be provided in the form of structured data 30 and unstructured data 32. As shown in FIG. 4A, the unstructured data of one example relates to post flight observations such that a pilot can supplement a flight plan following the conclusion of a flight with their observations which may be helpful to themselves or others when subsequently flying other similar routes. In this example, the unstructured data includes the following text: "unexpected turbulence over Denver, passengers extremely excited for football playoff game and could have used more flight attendants, work slowdown by ground crew in Chicago resulting in more delay than anticipated".

The unstructured data may be processed in various manners. For example, the associative memory system 10, such as the associative memory 14, may be configured to parse the unstructured data so as to identify words, phrases or other separable portions of the unstructured data. Additionally, the associative memory system, such as the associative memory, may be configured to extract certain words, phrases or other separable portions of the unstructured data, such as to identify various parts of speech, such as nouns, verbs, adjectives, adverbs, etc., and/or to identify particular key words or numeric values. Following processing of the unstructured data, the resulting flight plan may include a plurality of attribute categories having numeric or non-numeric attribute values drawn from the structured data, as well as attribute categories which identify the various parts of speech and attribute values drawn from the unstructured data, as shown in FIG. 4B.

The flight plan that is received may be stored, such as by the associative memory 14 or another database 18 in communication therewith. Associative memory is a data storage device in which a location is identified by its informational content rather than by names, addresses, or relative positions, and from which data, such as data regarding similar parcels, may be retrieved. In one embodiment, the associative memory is a multi-tier associative memory. In addition to storing the flight plan received by the receiver module 12, a plurality of prior flight plans including prior flight plans that have been supplemented as described above following their completion may also be stored by the associative memory or another database in communication therewith.

As a result of the associative memory 14, the flight plans are not simply stored, but the associative memory identifies relationships or associations between attribute categories and associated attribute values of the respective flight plans. In this regard and as shown in block 24 of FIG. 2, the associative memory is configured to compare attribute categories and values of the flight plan that has been received by the receiver module 12 with corresponding attribute categories and values of a plurality of prior flight plans to identify one or more related flight plans, among the plurality of prior flight plans. The associative memory may be configured to compare the attributes of the flight plans in various manners including a comparison of the attributes to identify flight plans having one or more matching attributes, that is, identical attribute categories and values or identical attribute categories with numeric attribute values that differ by no more than a predetermined amount or predetermined percentage. In this regard, the associative memory may be configured to identify the related flight plan(s) as those prior flight plans that include at least a predefined number of attribute categories and values that match corresponding attribute categories and values of the flight plan that was received by the receiver module. In some embodiments, the associative memory not only requires at least a predefined number of attribute categories and values to match, but also requires the attribute values of one or more specific attribute categories to match, such as the source and target of a flight.

Thus, the associative memory 14 of an example embodiment may be configured to compare attribute values of the flight plan with corresponding attribute values of a plurality of prior flight plans to identify one or more prior flight plans having one or more attribute values related to a destination target that match, and to further identify one or more attribute values that differ by no more than a predetermined percentage. Based on the attribute values of at least one identified flight plan and as described below, the modification module 16 includes instructions configured or operable to output to a flight management system a modified flight plan in which at least the predicted flight duration of the initial flight plan is modified based upon attribute values of the at least one identified prior flight plan, such that the attribute data is transformed into a modified flight plan input to the flight management system of an aircraft.

As noted above, the associative memory 14 may be configured to require the attribute categories and values to be identical. However, in another embodiment, the associative memory may be configured to require matching attribute categories with the numeric attribute values of a respective attribute to be within a predefined amount, termed a radius, to be considered to match. As shown in FIG. 6, a radius may be defined, such as by a user via the graphical user interface, with respect to a respective category of attribute. The radius defines the range, such as in terms of an actual value or magnitude or a percentage, by which the attribute values may differ and still be considered to match. In the example of FIG. 6, the number of passengers and the weight may differ by 0.05% and the number of crew may differ by 0% (that is, the number of crew must be identical) to be considered a match.

With reference to FIG. 5, for example, the flight plan received by the receiver module 12 is depicted at 40, while a listing of the related flight plans that were identified by the associative memory 14 is depicted in table 42. In this regard, each row of the table 42 represents a prior flight plan as identified by the flight number of the respective flight plan. Additionally, the right hand column of table 42 identifies the attribute categories and values of the prior flight plans that were found to match corresponding attribute categories and values of flight plan 40. The associative memory is not only configured to compare attribute categories and values that are structured as represented by FIG. 5, but also attribute categories and values that are unstructured, such as those comprising intangible data.

The associative memory 14 may be configured to determine a score associated with each related flight plan having one or more matching attributes, such that the related flight plans may be ranked, such as from the flight plan that is identified to be the most related as a result of having the greatest score to the flight plan that is identified to be related, but the least related, as a result of having the lowest score. A score may be determined in various manners including as a count of the number of attributes that are determined to match. In some embodiments, this count may be normalized based upon the largest number of attribute categories and values that were determined to match for many of the related flight plans, such that the maximum score is 1.0.

In an example embodiment, the associative memory 14 is configured to assign different weights to at least some of the attribute categories and to identify the related flight plan(s) based at least in part upon the differently weighted attribute categories. See operation 22 of FIG. 2. The associative memory may be configured to weight the different attribute categories itself, such as based upon the uniqueness of an attribute category that is found to match, such that an attribute category having a value that has only a single match among the prior flight plans is more greatly weighted than an attribute category having a value that is found to match many prior flight plans. Additionally or alternatively, the receiver module 12 of an example embodiment may be configured to present a graphical user interface, such as via the user interface, that permits a user to assign a weight to be associated with one or more of the attribute categories of the flight plan. For example, the graphical user interface may identify one or more of the different categories of attributes and permit a user to provide an indication of the weight that should be associated with the respective category of attributes. In this example embodiment of FIG. 6, weights of low, medium and high may be selected for each different category of attributes with the low, medium and high categories being translated, in turn, into corresponding numerical weights, such as 0.2, 0.6 and 1.0, respectively. However, other weighting schemes including a numerical weight selected from a predefined range may be alternatively employed.

In order to identify one or more related flight plans based at least in part upon the differently weighted attribute categories, the associative memory 14 may be configured to assign a score to each of the plurality of prior flight plans based upon the number of attribute values that are found to match as modified by the respective weights of the matching attribute categories. For example, each attribute value that is found to match may contribute to the score in an amount defined by 1× weight, wherein the weight is the numerical weight, generally between 0 and 1, assigned to the respective attribute category. The weighted contributions to the score from each of the matching attribute values may be summed and, in some embodiments, normalized, in order to produce the score for the prior flight plan. An example of the resulting scores is shown in the leftmost column of table 32 for each of the related flight plans. The associative memory may then identify the prior flight plans to be related based upon their respective scores, such as by identifying all prior flight plans having a score greater than a predetermined threshold to be a related flight plan.

As shown in FIG. 1 and in operation 26 of FIG. 2, the associative memory system 10 also includes a modification module 16 which, as described above, may include an I/O interface, a communication interface, a user interface and/or a processor that are specifically configured to modify the flight plan of the aircraft based upon information from one or more related flight plans. In this regard, the modification module is configured to modify the flight plan of the aircraft based upon the intangible data from one or more of the related flight plans. The modification module may be configured to modify the flight plan in various manners.

For example, the modification module 16 of an example embodiment may be configured to incorporate at least some of the intangible data into a corresponding category of attribute in the flight plan that was received by the receiver module 12. The intangible data may be incorporated in a manner to indicate that the intangible data has been provided by a prior flight plan and may serve to alert the pilot or flight dispatcher of unanticipated conditions along the flight route that may impact the flight including, for example, the duration of the flight. For example, unanticipated turbulence along the route may slow the flight and a work slowdown or work stoppage of the ground crew at the destination may similarly slow the flight and cause the flight to more likely be placed in a holding pattern upon nearing the destination as a result of difficulties associated with landing and disembarking prior flights. Further, issues with respect to passengers on a prior flight to a particular destination that are anticipated to be repeated on the flight for which the flight plan is being developed may alert the pilot, the flight dispatcher or the like to alter their preparation, such as by engaging one or more additional flight attendants.

Additionally or alternatively, the modification module 16 is configured to modify the flight plan by modifying the duration of the flight for which the flight plan is developed. In this regard, the duration of the flight may be modified from that initially provided by the pilot or flight dispatcher to a predicted duration that is based upon the durations of the related flight plans. In this regard, the predicted duration may be an average of the durations of the related flight plans. Alternatively, the durations of the related flight plans may be weighted based upon the relatedness of the related flight plans, such as based upon the score associated with respective ones of the related flight plans. As such, the duration of a respective related flight plan may be multiplied by its associated score and the products of the duration and score of each of the related flight plans may be summed prior to being divided by the sum of the scores.

As such, the modification module 16 is configured to modify the flight plan so as to provide additional information to the pilot or flight dispatcher and to provide a more realistic estimate of the duration and other parameters relating to the upcoming flight. Thus, scheduling associated with the flight may be performed in a more realistic manner, thereby facilitating air traffic flow, and the expectations of the passengers may be correspondingly set to a more appropriate level.

By utilizing an associative memory 14, the associative memory system 10, method and computer program product offer technical advantages in that the associative memory is configured to compare attributes and to identify related flight plans in an efficient manner. As such, the processing resources and power consumption are reduced in comparison to that otherwise consumed by a computing system in an effort to identify related flight plans in a manner that does not utilize an associative memory.

FIGS. 1 and 2 illustrate block diagrams of example systems, methods and/or computer program products according to example embodiments. It will be understood that each module or block of the block diagrams, and/or combinations of modules or blocks in the block diagrams, can be implemented by various means. Means for implementing the modules or blocks of the block diagrams, combinations of the modules or blocks in the block diagrams, or other functionality of example embodiments described herein may include hardware, and/or a computer program product including a non-transitory computer-readable storage medium (as opposed to a computer-readable transmission medium which describes a propagating signal) having one or more computer program code instructions, program instructions or executable computer-readable program code instructions stored therein. In this regard, program code instructions for carrying out the operations and functions of the modules of FIG. 1 and the blocks of FIG. 2 and otherwise described herein may be stored in the memory device of an example apparatus, and executed by a processor. As will be appreciated, any such program code instructions may be loaded onto a computer or other programmable apparatus (e.g., processor, memory device or the like) from a computer-readable storage medium to produce a particular machine, such that the particular machine becomes a means for implementing the functions specified in the block diagrams' modules and blocks.

These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the block diagrams' modules or blocks. The program code instructions may be retrieved from a computer-readable storage medium and loaded into a computer, processor or other programmable apparatus to configure the computer, processor or other programmable apparatus to execute operations to be performed on or by the computer, processor or other programmable apparatus. Retrieval, loading and execution of the program code instructions may be performed sequentially such that one instruction is retrieved, loaded and executed at a time. In some example embodiments, retrieval, loading and/or execution may be performed in parallel such that multiple instructions are retrieved, loaded and/or executed together. Execution of the program code instructions may produce a computer-implemented process such that the instructions executed by the computer, processor or other programmable apparatus provide operations for implementing the functions specified in the block diagrams' modules or blocks.

Accordingly, execution of instructions associated with the operations of the modules or blocks of the block diagrams by a processor, or storage of instructions associated with the modules or blocks of the block diagrams in a computer-readable storage medium, supports combinations of operations for performing the specified functions. It will also be understood that one or more modules or blocks of the block diagrams, and combinations of modules or blocks in the block diagrams, may be implemented by special purpose hardware-based computer systems and/or processors which perforin the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific teens are employed herein, they are used in a generic and descriptive sense only and not for purposes of limitation.

That which is claimed:

1. An associative memory system for modifying a flight plan based upon intangible data, the associative memory system comprising:

a receiver module configured to receive a flight plan of an aircraft, wherein the flight plan comprises a plurality of attribute categories and their associated attribute values;

an associative memory comprising a data storage device configured to identify a storage location from which data may be retrieved by its informational content rather than an address, said associative memory configured to compare attribute values of the flight plan with corresponding attribute values of a plurality of prior flight plans to identify one or more related flight plans from among the plurality of prior flight plans, wherein one or more related flight plans include intangible data related to a respective flight, wherein the associative memory is configured to differently weight at least some of the attribute categories and to identify one or more related flight plans based at least in part upon the differently weighted attribute categories; and a modification module configured to modify the flight plan of the aircraft based upon information from one or more of the related flight plans including the intangible data from one or more of the related flight plans.

2. An associative memory system according to claim 1 wherein the intangible data is included in unstructured data of one or more of the prior flight plans.

3. An associative memory system according to claim 2 wherein the intangible data comprises the unstructured data relating to one or more of weather en route, seasonal trends, employment issues, landing conditions, turbulence, work stoppages, work slowdowns or passenger characteristics.

4. An associative memory system according to claim 1 wherein the associative memory is configured to compare attribute categories and values that are both structured and unstructured.

5. An associative memory system according to claim 1 wherein a radius is defined relative to a numeric attribute value of a respective attribute, and wherein the associative memory is configured to identify numeric attribute values of the respective attributes of the flight plan and one or more prior flight plans to be related in an instance in which the numeric attribute values of the respective attributes differ by no more than the radius.

6. An associative memory system according to claim 1 wherein the modification module is configured to modify a flight duration of the flight plan based upon a combination of the flight durations of the one or more related flight plans.

7. An associative memory system according to claim 1, wherein the associative memory is configured to compare attribute values of the flight plan with corresponding attribute values of the plurality of prior flight plans to identify one or more prior flight plans having one or more attribute values related to a destination target that match, and one or more attribute values that differ by no more than a predetermined percentage, and wherein the modification module includes instructions operable to output to a flight management system a modified flight plan in which at least a predicted flight duration is modified based upon attribute values of at the least one identified prior flight plan.

8. A method for modifying a flight plan based upon intangible data, the method comprising:

receiving a flight plan of an aircraft, wherein the flight plan comprises a plurality of attribute categories and their associated attribute values;

using an associative memory to compare attribute values of the flight plan with corresponding attribute values of a plurality of prior flight plans to identify one or more related flight plans from among the plurality of prior flight plans, wherein one or more related flight plans include intangible data related to a respective flight, and wherein the associative memory comprises a data storage device configured to identify a storage location from which data may be retrieved by its informational content rather than an address, wherein using the associative memory comprises using the associative memory to differently weight at least some of the attribute categories and to identify one or more related flight plans based at least in part upon the differently weighted attribute categories; and modifying the flight plan of the aircraft based upon information from one or more of the related flight plans including the intangible data from one or more of the related flight plans using the associative memory to differently weight at least some of the attribute categories and to identify one or more related flight plans based at least in part upon the differently weighted attribute categories.

9. A method according to claim 8 wherein the intangible data is included in unstructured data of one or more of the prior flight plans.

10. A method according to claim 9 wherein the intangible data comprises the unstructured data relating to one or more of weather en route, seasonal trends, employment issues, landing conditions, turbulence, work stoppages, work slowdowns or passenger characteristics.

11. A method according to claim 8 wherein the associative memory is configured to compare attribute categories and values that are both structured and unstructured.

12. A method according to claim 8 wherein a radius is defined relative to a numeric attribute value of a respective attribute, and wherein the method further comprises using the associative memory to identify numeric attribute values of the respective attributes of the flight plan and one or more prior flight plans to be related in an instance in which the numeric attribute values of the respective attributes differ by no more than the radius.

13. A method according to claim 8 wherein modifying the flight plan comprises modifying a flight duration of the flight plan based upon a combination of the flight durations of the one or more related flight plans.

14. A method according to claim 13, further including the steps of:

using the associative memory to compare attribute values of the flight plan with corresponding attribute values of the plurality of prior flight plans to identify one or more prior flight plans having one or more attribute values related to a destination target that match, and one or more attribute values that differ by no more than a predetermined percentage, and outputting to a flight management system a modified flight plan in which at least a predicted flight duration is modified based upon attribute values of at the least one identified prior flight plan.

* * * * *